(12) United States Patent
Song et al.

(10) Patent No.: US 12,079,961 B2
(45) Date of Patent: Sep. 3, 2024

(54) METHOD, APPARATUS, ELECTRONIC DEVICE, AND STORAGE MEDIUM FOR PROCESSING IMAGE

(71) Applicant: TENCENT TECHNOLOGY (SHENZHEN) COMPANY LIMITED, Guangdong (CN)

(72) Inventors: Yibing Song, Guangdong (CN); Yuying Ge, Guangdong (CN); Wei Liu, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 8 days.

(21) Appl. No.: 18/051,408

(22) Filed: Oct. 31, 2022

(65) Prior Publication Data
US 2023/0077356 A1  Mar. 16, 2023

Related U.S. Application Data

(63) Continuation of application No. PCT/CN2022/072892, filed on Jan. 20, 2022.

(30) Foreign Application Priority Data

Jan. 27, 2021 (CN) .......................... 202110141360.3

(51) Int. Cl.
*G06T 5/50* (2006.01)
*G06T 3/40* (2024.01)
(Continued)

(52) U.S. Cl.
CPC .................. *G06T 5/50* (2013.01); *G06T 3/40* (2013.01); *G06V 10/44* (2022.01); *G06V 10/761* (2022.01);
(Continued)

(58) Field of Classification Search
None
See application file for complete search history.

(56) References Cited

U.S. PATENT DOCUMENTS

2021/0241531 A1* 8/2021 Lee .......................... G06T 19/00

FOREIGN PATENT DOCUMENTS

| CN | 108876814 A | 11/2018 |
|---|---|---|
| CN | 110211196 A | 9/2019 |

(Continued)

OTHER PUBLICATIONS

Raffiee et al. GarmentGAN: Photo-realistic Adversarial Fashion Transfer, Mar. 4, 2020 (Year: 2020).*

(Continued)

*Primary Examiner* — Yingchun He
(74) *Attorney, Agent, or Firm* — Banner & Witcoff, Ltd.

(57) ABSTRACT

An image processing method and an image processing apparatus are provided. The method includes: acquiring a first image including an image of a target person and a second image including an image of target clothes; generating, based on image features of the first image and image features of the second image, a target appearance flow feature for representing deformation of the target clothes matching a body of the target person, and generating, based on the target appearance flow feature, a deformed image of the target clothes matching the body; and generating a virtual dress-up image, in which the target person wears the target clothes matching the body, by fusing the deformed image with the first image.

20 Claims, 5 Drawing Sheets

(51) Int. Cl.
*G06V 10/44* (2022.01)
*G06V 10/74* (2022.01)

(52) U.S. Cl.
CPC ............... *G06T 2207/20221* (2013.01); *G06T 2207/30196* (2013.01)

(56) References Cited

FOREIGN PATENT DOCUMENTS

| CN | 111709874 A | 9/2020 |
| CN | 113570685 A | 10/2021 |
| JP | 2005216094 A | 8/2005 |
| JP | 2021108206 A | 7/2021 |

OTHER PUBLICATIONS

Xintong Han et al., "ClothFlow: A Flow-Based Model for Clothed Person Generation", 2019 IEEE/CVF International Conference on Computer Vision (ICCV), Nov. 2, 2019, pp. 10470-10479.
International Search Report for PCT/CN2022/072892 dated, Apr. 20, 2022 (PCT/ISA/210).
Apr. 1, 2024—(JP) Office Action—App 2023-522881.

* cited by examiner

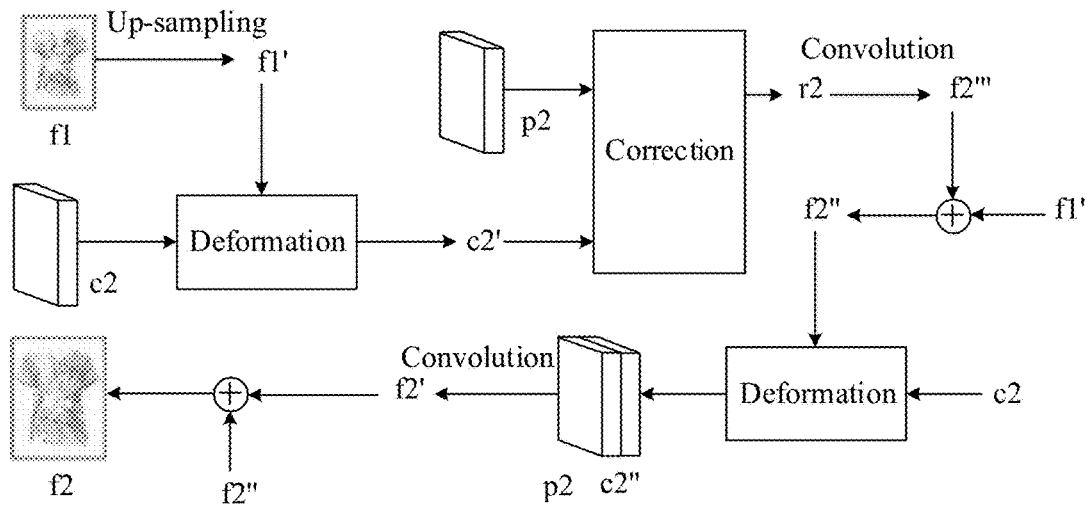

FIG. 4

S210
Call a virtual dress-up assistant model, and input a body analysis result corresponding to a person image including a specified person and a first clothes image including to-be-worn clothes to the virtual dress-up assistant model, to obtain an assistant image outputted by the virtual dress-up assistant model, in the assistant image, the specified person wearing the to-be-worn clothes matching a body of the specified person S230
Input a second clothes image including original clothes and the assistant image to a to-be-trained virtual dress-up student model, to obtain a student image outputted by the to-be-trained virtual dress-up student model, in the student image, the specified person wearing the original clothes matching the body of the specified person in the assistant image, the original clothes being clothes worn by the specified person in the person image S250
Use the person image as a teacher image, and update parameters of the to-be-trained virtual dress-up student model according to image loss information between the student image and the teacher image

FIG. 5

METHOD, APPARATUS, ELECTRONIC DEVICE, AND STORAGE MEDIUM FOR PROCESSING IMAGE

CROSS-REFERENCE TO RELATED APPLICATION(S)

This application is a continuation application of International Application No. PCT/CN2022/072892, filed Jan. 20, 2022, which claims priority to Chinese Patent Application No. 202110141360.3, filed with the China National Intellectual Property Administration on Jan. 27, 2021, the disclosures of which are herein incorporated by reference in their entireties.

FIELD

The disclosure relates to the field of image processing technologies, and in particular, to a method, an apparatus, an electronic device, and a storage medium for processing an image.

BACKGROUND

A virtual dress-up technology means fusing a body image with a clothing image through technical means to obtain an image with a user wearing clothes, so as to learn (or visualize) the effect of the user wearing clothes, so that the user does not need to wear real clothes for the same purpose. The virtual dress-up technology is widely used in various fields such as online shopping, clothing display, clothing design, or virtual try-on during offline shopping.

In the current virtual dress-up technology, a body analysis result of a body image is required. An ideal virtual dress-up dataset includes an image of a specified person wearing any clothes, an image including target clothes, and an image including the specified person wearing the target clothes. However, since it is difficult to obtain images of a same person wearing two pieces of different clothes with a same action (or same pose), the virtual dress-up dataset in the related art includes only the image of the specified person wearing the target clothes, and a body analysis result is required to determine a target clothes region of the specified person, and then the image including the target clothes is used to reconstruct a body image.

It may be learned that, the realization of the technology greatly relies on the body analysis result. When the body analysis result is inaccurate, a virtual dress-up image in which the specified person does not match the target clothes is generated. In addition, in actual application scenarios, a body analysis process requires a long time, resulting in a failure of obtaining a real-time virtual dress-up result.

SUMMARY

In order to resolve the above technical problems, embodiments of the disclosure provide a method, an apparatus, an electronic device, and a computer-readable storage medium for processing an image, which may realize virtual dress-up without relying on a body analysis result. In this way, various problems caused by virtual dress-up that relies on the body analysis result to perform virtual dress-up are avoided, thereby realizing high-quality virtual dress-up. In addition, the efficiency of virtual dress-up is improved, and real-time virtual dress-up is realized.

An aspect of the embodiments of the disclosure provides an image processing method, performed by a computer device, the method including: acquiring a first image including an image of a target person and a second image including an image of target clothes; generating, based on image features of the first image and image features of the second image, a target appearance flow feature for representing deformation of the target clothes matching a body of the target person, and generating, based on the target appearance flow feature, a deformed image of the target clothes matching the body; and generating a virtual dress-up image, in which the target person wears the target clothes matching the body, by fusing the deformed image with the first image.

An aspect of the embodiments of the disclosure provides an image processing apparatus, including: at least one memory configured to store program code; and at least one processor configured to read the program code and operate as instructed by the program code, the program code including: image acquisition code configured to cause the at least one processor to acquire a first image including an image of a target person and a second image including an image of target clothes; information generation code configured to cause the at least one processor to: generate, based on image features of the first image and image features of the second image, a target appearance flow feature for representing deformation of the target clothes matching a body of the target person, and generate, based on the target appearance flow feature, a deformed image of the target clothes matching the body; and virtual dress-up code configured to cause the at least one processor to generate a virtual dress-up image of the target person wearing the target clothes by fusing the deformed image with the first image.

According to an aspect of the embodiments of the disclosure, an electronic device is provided, including a processor and a memory, the memory storing computer-readable instructions, the computer-readable instructions, when executed by the processor, implementing the image processing method described above.

According to an aspect of the embodiments of the disclosure, a computer-readable storage medium is provided, storing computer-readable instructions, the computer-readable instructions, when executed by a processor of a computer, causing the computer to perform the image processing method described above.

According to an aspect of the embodiments of the disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the image processing method according to the optional embodiments of the disclosure.

BRIEF DESCRIPTION OF THE DRAWINGS

Accompanying drawings herein are incorporated into a specification and constitute a part of this specification, show embodiments that conform to the disclosure, and are used for describing a principle of the disclosure together with this specification. Apparently, the accompanying drawings described below are merely some embodiments of the disclosure, and a person of ordinary skill in the art may further obtain other accompanying drawings according to the accompanying drawings without creative efforts. In the accompanying drawings.

FIG. 4 is a schematic flowchart of appearance flow feature prediction performed by an "FN-2" module shown in FIG. 3 in a second image feature layer.

FIG. 5 is a flowchart of an image processing method according to an embodiment of the disclosure.

DETAILED DESCRIPTION

Figure 1:
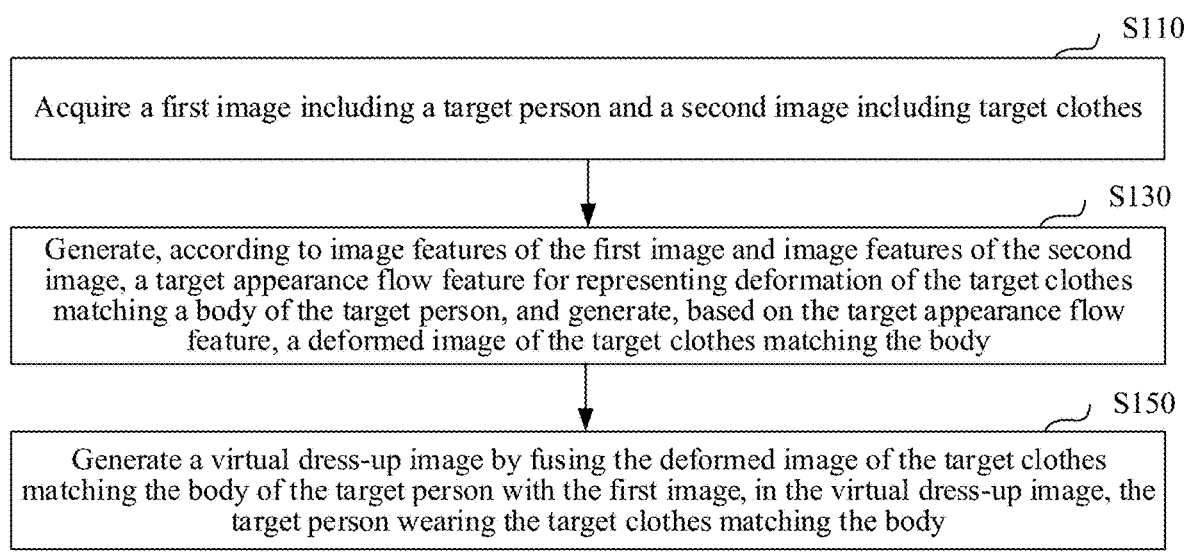
FIG. 1 is a schematic diagram of an implementation environment involved in the disclosure.

Example embodiments are described in detail herein, and examples of the example embodiments are shown in the accompanying drawings. When the following descriptions are made with reference to the accompanying drawings, unless otherwise indicated, same numbers in different accompanying drawings represent same or similar elements. The implementations described in the following example embodiments do not represent all implementations that are consistent with the disclosure. On the contrary, the implementations are merely examples of devices and methods that are described in detail in the appended claims and that are consistent with some aspects of the disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely illustrative descriptions and do not necessarily include all of the content and operations/steps, nor are the flowcharts necessarily performed in the order described. For example, some operations/steps may be further divided, while some operations/steps may be combined or partially combined. Therefore, an actual execution order may change according to an actual case.

The "plurality of" mentioned in the disclosure means two or more. The terms "first", "second", and the like used in the disclosure may be used for describing various concepts in this specification. However, the concepts are not limited by the terms unless otherwise specified. The terms are merely used for distinguishing one concept from another concept. For example, without departing from the scope of the disclosure, a first image may be referred to as a second image, and similarly, the second image may be referred to as the first image.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, the AI is a comprehensive technology of computer science, which attempts to understand essence of intelligence and produces a new intelligent machine that may respond in a manner similar to human intelligence. AI is to study design principles and implementation methods of various intelligent machines, so that the machines have the functions of perception, reasoning, and decision-making.

The AI technology is a comprehensive discipline and relates to a wide range of fields including both hardware-level technologies and software-level technologies. The basic AI technology generally includes technologies such as sensors, dedicated AI chips, cloud computing, distributed storage, big data processing technologies, operating/interaction systems, and mechatronics. AI software technologies mainly include a natural language processing (NLP) technology and machine learning (ML).

ML is a multi-field interdiscipline, and relates to a plurality of disciplines such as the probability theory, statistics, the approximation theory, convex analysis, and the algorithm complexity theory. The machine learning specializes in studying how a computer simulates or implements a human learning behavior to obtain new knowledge or skills, and reorganize an existing knowledge structure, to keep improving performance of the computer. The machine learning, as the core of AI, is a basic way to make the computer intelligent, and is applicable to various fields of AI. ML and deep learning generally include technologies such as an artificial neural network, a belief network, reinforcement learning, transfer learning, inductive learning, and learning from demonstrations.

Computer vision (CV) is a science that studies how to enable a machine to "see", and to be specific, to implement machine vision such as recognition, tracking, measurement, and the like for a target by using a camera and a computer in replacement of human eyes, and further perform graphic processing, so that the computer processes the target into an image more suitable for human eyes to observe, or more suitable to be transmitted to an instrument for detection. As a scientific discipline, CV studies related theories and technologies and attempts to establish an AI system that may obtain information from images or multidimensional data. The CV technologies generally include technologies such as image processing, image recognition, image semantic understanding, image retrieval, video processing, video semantic understanding, video content/behavior recognition, three-dimensional object reconstruction, virtual reality, augmented reality, synchronous positioning, and map construction, and further include biometric feature recognition technologies such as common face recognition and fingerprint recognition.

An image processing method provided in the embodiments of the disclosure is described below based on the AI technology and the CV technology.

An embodiment of the disclosure provides an image processing method, which is performed by a computer device, and may be used to fuse a body image with a clothes image. In an example embodiment, the computer device is a terminal, and the terminal may be a smart phone, a tablet computer, a notebook computer, a desktop computer, a smart speaker, a smart watch, an on-board computer, or the like. In another example embodiment, the computer device is a server. The server may be an independent physical server, or may be a server cluster including a plurality of physical servers or a distributed system. A plurality of servers may form a blockchain, and the servers are nodes on the blockchain. The server may be alternatively a cloud server providing basic cloud computing services, such as a cloud service, a cloud database, cloud computing, a cloud function, cloud storage, a network service, cloud communication, a middleware service, a domain name service, a security service, big data, and an artificial intelligence (AI) platform.

The image processing method provided in this embodiment of the disclosure is applicable to any scenario of fusing a body image with a clothes image. For example, in a scenario of virtual dress-up during online shopping, if a user wants to know an effect of wearing a piece of clothes, only a body image of the user and a clothes image of the clothes are required to be provided. A body image of the user wearing the clothes may be obtained by processing the body image and the clothes image by using the method provided in this embodiment of the disclosure, which realizes online virtual dress-up without requiring the user to wear the real clothes.

In addition, the image processing method provided in this embodiment of the disclosure is further applicable to scenarios such as clothing design, clothing display, or virtual try-on during offline shopping, so as to provide a real-time virtual dress-up function. Details are not enumerated herein.

FIG. 1 is a flowchart of an image processing method according to an embodiment of the disclosure. The image processing method includes at least S110 to S150. S110 to S150 may be implemented as a virtual dress-up student model. The virtual dress-up student model is an AI model, which may realize the virtual dress-up of a target person without relying on a body analysis result. The model may not only generate high-quality virtual dress-up images, but also improve the real-time performance of virtual dress-up.

The image shown in FIG. 1 is described below in detail.

S110: Acquire a first image including a target person and a second image including target clothes.

The target person in this embodiment is a person for which virtual dress-up is to be performed, and the target clothes are clothes the target person is to wear in a virtual dress-up image.

For example, in the scenario of virtual dress-up during online shopping, the target person is a user who is currently shopping online, the first image is a body image of the user provided by the user, and the second image may be a target clothes image loaded in a shopping platform. The target person included in the first image and the target clothes included in the second image may be determined according to actual application scenarios. This is not limited herein.

S130: Generate, according to image features of the first image and image features of the second image, a target appearance flow feature for representing deformation of the target clothes matching a body of the target person, and generate, based on the target appearance flow feature, a deformed image of the target clothes matching the body. Here, the target clothes matching the body may mean that the target clothes are simulated or superimposed on the body image. For example, the target clothes matching the body may refer to a state in which an image of the target clothes is positioned (e.g., superimposed) on a region of an image of the body of the target person. For example, the target clothes matching the body may refer to a state in which an image of the target clothes positioned on the region of the image of the body of the target person conforms to a body shape or a body silhouette of the target person.

First, the image features of the first image are obtained by performing image feature extraction on the first image, and the image features of the second image are obtained by performing image feature extraction on the second image. For example, in some embodiments, the first image may be inputted to a first image feature extraction model, and the second image may be inputted to a second image feature extraction model (that is, the first image is used as an input signal of the first image feature extraction model, and the second image is used as an input signal of the second image feature extraction model). The first image feature extraction model and the second image feature extraction model are both configured with an image feature extraction algorithm, so as to obtain the image features outputted by the first image feature extraction model for the first image and the image features outputted by the second image feature extraction model for the second image.

The image features of the first image outputted by the first image feature extraction model and the image features of the second image outputted by the second image feature extraction model each may include a plurality of layers of image features. The plurality of layers of image features are a plurality of feature maps successively obtained during the image feature extraction of the first image and the second image.

For example, the first image feature extraction model and the second image feature extraction model each may be a pyramid feature extraction model. The pyramid feature extraction model is configured with a feature pyramid network (FPN). Feature maps outputted by the feature pyramid network are the plurality of layers of image features corresponding to the image. For example, in some embodiments, a bottom-up part of the pyramid feature extraction model may be used to perform image feature extraction on the first image and the second image. It is understood that, the bottom-to-top part performs image feature extraction by using a convolutional network. As the convolution proceeds, a spatial resolution of the images is less, and spatial information is lost, which however enriches high-level semantic information, so that a plurality of layers of image features in descending order of size are obtained.

The appearance flow feature is a two-dimensional coordinate vector, which may be used to indicate a pixel of the source image that may be used to reconstruct a specified pixel of a target image. In this embodiment, in order to realize high-quality virtual dress-up, an accurate and dense correspondence between the body of the target person and the target clothes is required to be established, so that the target clothes matching the body may have deformation based on the correspondence. Therefore, in this embodiment, the source image is the second image, which may be a target clothes region in the second image, and the to-be-reconstructed target image is the deformed image of the target clothes matching the body of the target person in the first image.

The target appearance flow feature may represent the deformation of the target clothes matching the body of the target person in the first image, and the deformed image of the target clothes matching the body may be generated according to the obtained target appearance flow feature.

When the image feature of the first image includes the plurality of layers of image features outputted by the first image feature extraction model and the image feature of the second image includes the plurality of layers of image features outputted by the second image feature extraction model, the appearance flow features may be extracted layer by layer from the plurality of layers of image features outputted by the first image feature extraction model and the plurality of layers of image features outputted by the second image feature extraction model, and the appearance flow feature extracted from a last image feature layer is used as the final generated target appearance flow feature.

For example, an appearance flow feature for representing the deformation of the target clothes matching the body of the target person may be extracted from a first image feature layer of the image features outputted by the first image feature extraction model and the image features outputted by the second image feature extraction model. An appearance flow feature corresponding to each previous image feature layer following the first image feature layer of the image features outputted by the first image feature extraction model and the image features outputted by the second image feature extraction model is optimized, to obtain an appearance flow feature corresponding to a current image feature layer.

During the extraction of the appearance flow features layer by layer from the plurality of layers of image features outputted by the first image feature extraction model and the plurality of layers of image features outputted by the second image feature extraction model, the appearance flow feature may be extracted according to a second-order smoothing constraint. The second-order smoothing constraint is a preset constraint for a linear correspondence between adjacent appearance flows for further retaining pattern characteristics, stripe characteristics, and the like of the target clothes, thereby improving the image quality of the generated deformed image of the target clothes matching the body of the target person.

S150: Generate a virtual dress-up image by fusing the deformed image of the target clothes matching the body of the target person with the first image, in the virtual dress-up image, the target person wearing the target clothes matching the body.

Fusing the deformed image of the target clothes matching the body of the target person and the first image into the virtual dress-up image may be implemented by using an image fusion algorithm applicable to virtual dress-up, such as a Res-UNet algorithm. This is not limited in this embodiment.

In the technical solutions provided in the embodiments of the disclosure, virtual dress-up does not rely on the body analysis result. Instead, the target appearance flow feature of the target clothes matching the deformation of the body of the target person is acquired to generate the deformation of the target clothes matching the body, and finally, the image of the deformed target clothes (such as the deformed image) is fused with the first image including the target person to obtain a virtual dress-up image, thereby avoiding problems such as low image quality of the virtual dress-up image and weak real-time performance of the virtual dress-up caused by the virtual dress-up that relies the body analysis result, and realizing high-quality virtual dress-up. In addition, the efficiency of virtual dress-up is improved, and real-time virtual dress-up is realized.

Figure 2:
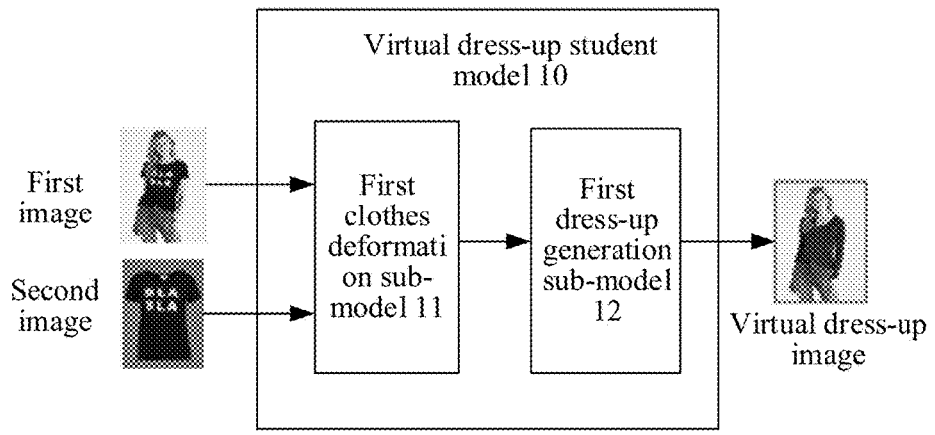
FIG. 2 is a schematic structural diagram of a virtual dress-up student model according to an embodiment of the disclosure.

FIG. 2 is a schematic structural diagram of a virtual dress-up student model according to an embodiment of the disclosure. An example virtual dress-up student model 10 includes a first clothes deformation sub-model 11 and a first dress-up generation sub-model 12. The first clothes deformation sub-model 11 may perform S130 in the embodiment shown in FIG. 1, and the first dress-up generation sub-model 12 may perform S150 in the embodiment shown in FIG. 1.

As shown in FIG. 2, by inputting the first image including the target person and the second image including the target clothes to the virtual dress-up student model 10, the virtual dress-up student model 10 may output a corresponding virtual dress-up image. In the outputted virtual dress-up image, the target person wears the target clothes matching the body.

The virtual dress-up student model 10 uses only the first image and the second image but no other additional input signals, and a body analysis result of the target person included in the first image is not required to be inputted to the virtual dress-up student model 10.

Figure 3:
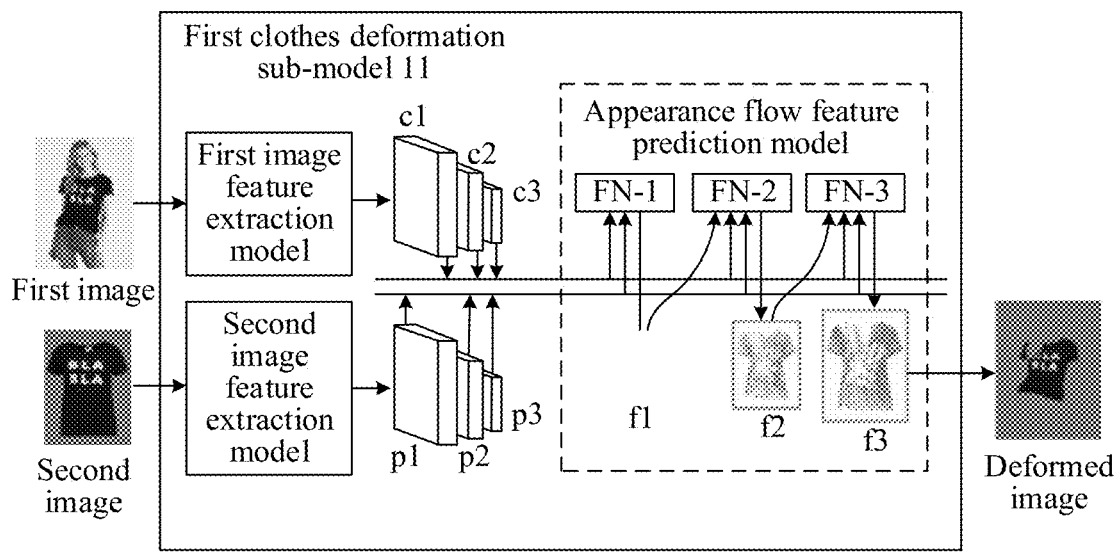
FIG. 3 is a schematic structural diagram of a first clothes deformation sub-model 11 shown in FIG. 2 according to an embodiment.

FIG. 3 is a schematic structural diagram of the first clothes deformation sub-model 11 shown in FIG. 2 according to an embodiment. As shown in FIG. 3, the first clothes deformation sub-model 11 includes a first image feature extraction model, a second image feature extraction model, and an appearance flow feature prediction model.

The first image feature extraction model is configured to extract the image feature of the first image, and the second image feature extraction model is configured to extract the image feature of the second image. As shown in FIG. 3, the first image feature extraction model performs image feature extraction on the first image, and successively obtains a plurality of layers of image features shown by c1-c3. The second image feature extraction model performs image feature extraction on the second image, and successively obtains a plurality of layers of image features shown by p1-p3.

The plurality of layers of image features shown in FIG. 3 are merely examples. Numbers of image feature layers to be extracted from the input images through the first image feature extraction model and the second image feature extraction model may be set according to embodiments. This is not limited in this embodiment.

The appearance flow feature prediction model is configured to extract appearance flow features layer by layer from the plurality of layers of image features outputted by the first image feature extraction model and the plurality of layers of image features outputted by the second image feature extraction model, and use the appearance flow feature extracted from a last image feature layer as the final generated target appearance flow feature. For example, an "FN-1" module shown in FIG. 3 is configured to perform appearance flow feature prediction on a first image feature layer, an "FN-2" module is configured to perform appearance flow feature prediction on a second image feature layer, and an "FN-3" module is configured to perform appearance flow feature prediction on a third image feature layer. That is, the appearance flow feature prediction model is a progressive appearance flow feature prediction model.

As shown in FIG. 3, the appearance flow feature prediction model extracts, for the first time from a first image feature layer of the image features outputted by the first image feature extraction model and the image features outputted by the first image feature extraction model the second image feature extraction model, the appearance flow feature for representing the deformation of the target clothes matching the body of the target person. The appearance flow feature prediction model optimizes an appearance flow feature outputted by each previous image feature layer following the first image feature layer of the image features outputted by the first image feature extraction model and the image features outputted by the second image feature extraction model, to obtain an appearance flow feature corresponding to a current image feature layer.

In the progressive processing manner, as convolution progresses, a spatial resolution of the plurality of layers of image features gradually decreases, and spatial information is gradually lost, which enriches high-level semantic information, so that feature information included in the appearance flow features obtained layer by layer by the appearance flow feature prediction model is more abundant and accurate. For example, feature information included in appearance flow features f1 to f3 shown in FIG. 3 is gradually abundant and gradually matches the body of the target person.

According to an example embodiment of the disclosure, the appearance flow feature obtained by the appearance flow feature prediction model from the last image feature layer may very accurately reflect the deformation of the target clothes matching the body of the target person, and an accurate and close correspondence with the body of the target person may be established based on the deformed image corresponding to the target clothes generated by the appearance flow feature obtained by the appearance flow feature prediction model from the last image feature layer. Accordingly, subsequent fusion may be performed according to the accurate deformation of the target clothes and the body of the target person to obtain a high-quality virtual dress-up image.

FIG. 4 is a schematic flowchart of appearance flow feature prediction performed by an "FN-2" module shown in FIG. 3 in a second image feature layer. As shown in FIG. 4, up-sampling is first performed on the appearance flow feature f1 corresponding to the previous image feature layer to obtain an up-sampling feature f1', and then first deformation is performed on the image feature c2 of the second image corresponding to the current feature layer according to the up-sampling feature f1', to obtain a first deformed feature c2'. Next, the first deformed feature c2' is corrected based on the image feature p2 of the first image corresponding to the current image feature layer, to obtain a corrected feature r2, and a convolutional calculation is performed on the corrected feature r2 to obtain a first convolution feature f2'''. Then, second deformation is performed on the image feature c2 of the second image corresponding to the current image feature layer according to a feature f2'' obtained by splicing the first convolution feature f2''' and the up-sampling feature f1', to obtain a second deformed feature p2 c2''. The second deformed feature is a combination of the image feature p2 of the first image outputted by the current image feature layer and another feature c2''. Finally, a second convolutional calculation is performed on the second deformed feature p2 c2'', and the calculated second convolution feature f2' is spliced with the first convolution feature f2'', to obtain an appearance flow feature f2 corresponding to the current image feature layer.

According to an example embodiment, the above that up-sampling the appearance flow feature outputted by the previous image feature layer helps improve the resolution of the appearance flow feature of the current image feature layer. Subsequently, two deformation processes and two convolution calculations are performed to further refine feature information included in the up-sampling feature, which is equivalent to adding spatial information to the appearance flow feature outputted by the previous image feature layer, so as to realize optimization of the appearance flow feature outputted by the previous image feature layer, and obtain an appearance flow feature that may further reflect the deformation of the target clothes matching the body of the target person.

In some embodiments, during the extraction of the appearance flow feature layers by layer by the appearance flow feature prediction model from the plurality of layers of image features outputted by the first image feature extraction model and the plurality of layers of image features outputted by the second image feature extraction model, the appearance flow feature is extracted according to a second-order smoothing constraint preset for a linear correspondence between adjacent appearance flows, to further retain pattern characteristics, stripe characteristics, and the like of the target clothes.

FIG. 5 is a flowchart of an image processing method according to an embodiment of the disclosure. As shown in FIG. 5, based on the embodiment shown in FIG. 1, the method further includes S210 to S250, which are described in detail as follows:

S210: Call a virtual dress-up assistant model, and input a body analysis result corresponding to a person image including an image of a specified person and a first clothes image including an image of clothes to the virtual dress-up assistant model, to obtain an assistant image outputted by the virtual dress-up assistant model; in the assistant image, the specified person wearing the clothes in the first clothes image matching a body of the specified person.

This embodiment discloses a process of training the virtual dress-up student model shown in FIG. 2. In the training stage of the virtual dress-up student model, the virtual dress-up assistant model is required to be called for auxiliary training. The virtual dress-up assistant model is an AI model that relies on the body analysis result. By inputting the body analysis result corresponding to the person image including the specified person and the first clothes image including clothes to be worn to the virtual dress-up assistant model, the virtual dress-up assistant model may output a corresponding assistant image. In the assistant image, the specified person wears the clothes in the first clothes image matching the body of the specified person.

In this embodiment, a virtual dress-up data set is an image data set including the person image including an image of the specified person, the first clothes image including an image of the clothes to be worn, and a second clothes image including original clothes worn by the specified person. The person image, the first clothes image, and the second clothes image each may include a plurality of images, and the specified persons included in the different person images may be the same or different. This is not limited in this embodiment.

S230: Input a second clothes image including original clothes and the assistant image to the to-be-trained virtual dress-up student model, to obtain a student image outputted by the to-be-trained virtual dress-up student model, in the student image, the specified person wearing the original clothes matching the body of the specified person in the assistant image, the original clothes being clothes worn by the specified person in the person image.

Since the virtual dress-up student model may realize virtual dress-up without relying on the body analysis result, and a feature extracted by the virtual dress-up assistant model based on the body analysis result includes more abundant semantic information and feature expressions, in this embodiment, the virtual dress-up assistant model is used to guide the training of the virtual dress-up student model.

That is, in this embodiment, the virtual dress-up student model is trained by knowledge distillation.

Knowledge distillation means training a student network by using intrinsic information of a teacher network. In this embodiment, the teacher network is the virtual dress-up assistant model, and the intrinsic information of the teacher network is the feature expressions and the semantic information extracted by the virtual dress-up assistant model according to the body analysis result.

Since the trained virtual dress-up student model has fully learned the accurate and dense correspondence between a body and clothes, during actual application, the virtual dress-up student model may output a high-quality virtual dress-up image according to the first image including the target person and the second image including the target clothes inputted therein without acquiring the body analysis result of the target person.

In this embodiment, the assistant image outputted by the virtual dress-up assistant model is inputted to the to-be-trained virtual dress-up student model as assistant knowledge, and the second clothes image including the original clothes is inputted to the to-be-trained virtual dress-up student model, so that the to-be-trained virtual dress-up student model outputs the student image. The specified person in the student image wears the original clothes matching the body of the specified person in the assistant image.

S250: Use the person image as a teacher image, and update parameters of the to-be-trained virtual dress-up student model according to image loss information between the student image and the teacher image.

In this embodiment, the person image is used as the teacher image to monitor the training process of the virtual dress-up student model. That is, the virtual dress-up student model may be directly monitored by the teacher image during the training, which helps improves the performance of the virtual dress-up student model. Therefore, during actual application, the final trained virtual dress-up student model may output a high-quality virtual dress-up image according to the first image and second image inputted therein without relying on the body analysis result.

The image loss information between the student image and the teacher image may be obtained by calculating a loss function value of the student image relative to the teacher image. For example, image loss values of the student image relative to the teacher image may be acquired, the image loss values including at least one of a pixel distance loss function value, a perception loss function value, or an adversarial loss function value, then the image loss values are summed to obtain an image loss sum value of the student image relative to the teacher image, and finally, the image loss sum value is used as the image loss information between the student image and the teacher image to update the parameters of the to-be-trained virtual dress-up student model, thereby completing the training of the virtual dress-up student model.

The to-be-trained virtual dress-up student model is trained a plurality of times to gradually improve the performance of the virtual dress-up student model. When the image loss information between the student image and the teacher image is less than or equal to a preset image loss threshold, it indicates that the virtual dress-up student model has relatively desirable model performance. In this case, the training process of the virtual dress-up student model may be ended.

In addition, the body analysis result may include information such as key body points, hot body pose pictures, and dense pose estimation. In most cases, the virtual dress-up assistant model may extract more abundant semantic information based on the body analysis result, and therefore may predict a more accurate appearance flow feature. Therefore, the image quality of the assistant image outputted by the virtual dress-up assistant model is higher than that of the student image outputted by the virtual dress-up student model.

If the body analysis result inputted to the virtual dress-up assistant model is inaccurate, the virtual dress-up assistant model will provide completely wrong guidance to the virtual dress-up student model during the training process of the virtual dress-up student model. Therefore, an adjustable knowledge distillation mechanism is required to ensure that the virtual dress-up student model is trained by using only accurate assistant images.

Before S250, an image quality difference between the assistant image and the student image is obtained. If it is determined that the image quality difference is positive, it indicates that the image quality of the assistant image is higher than that of the student image, and then S250 is performed, to train the virtual dress-up student model based on the assistant image. If it is determined that the image quality difference is a negative value or zero, it indicates that the image quality of the assistant image is not higher than that of the student image and that the body analysis result inputted to the virtual dress-up assistant model may be completely wrong. Therefore, S250 is not performed, and a next training process of the virtual dress-up student model is initiated.

Figure 6:
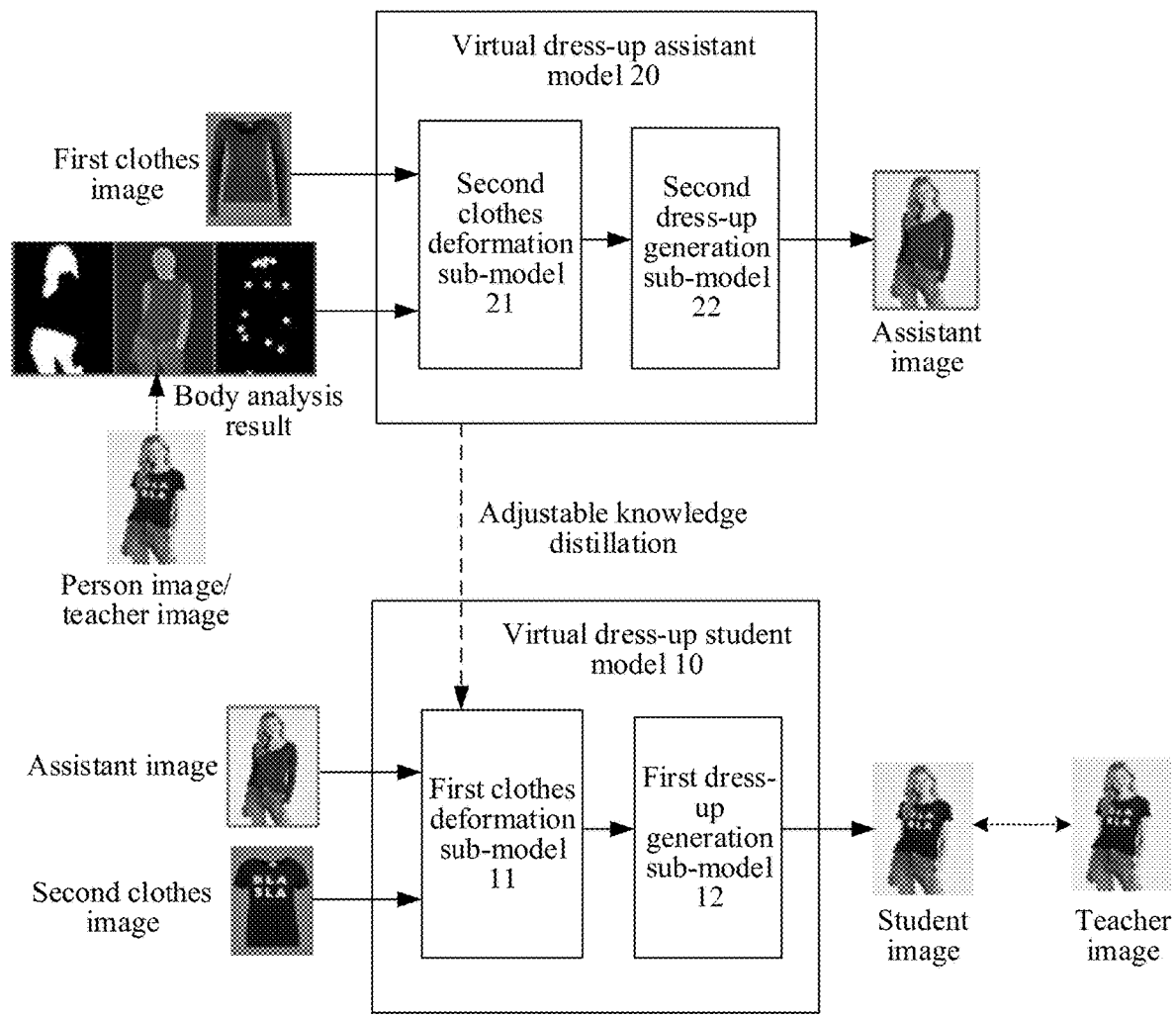
FIG. 6 is a schematic diagram of a training process of the virtual dress-up student model according to an embodiment of the disclosure.

FIG. 6 is a schematic diagram of a training process of the virtual dress-up student model according to an embodiment of the disclosure. As shown in FIG. 6, a virtual dress-up assistant model 20 is used as an auxiliary model for training the virtual dress-up student model 10. The virtual dress-up assistant model 20 outputs a corresponding assistant image according to the first clothes image inputted therein and the body analysis result obtained by performing body analysis on the person image (that is, the teacher image). Then, the assistant image and the second clothes image outputted by the virtual dress-up assistant model 20 are inputted to the virtual dress-up student model 10 to obtain the student image outputted by the virtual dress-up student model 10. Then the parameters of the to-be-trained virtual dress-up student model 10 are updated according to the image loss information between the student image and the teacher image.

The virtual dress-up assistant model 20 includes a second clothes deformation sub-model 21 and a second clothes generation sub-model 22. The second clothes deformation sub-model 21 may be called to generate, according to the body analysis result and an image feature of the first clothes image, a deformed image of clothes matching the body of the specified person. For a detailed process, refer to the description of the embodiments corresponding to FIG. 3 and FIG. 4, and the details are not repeated herein. The second dress-up generation sub-model 22 may be called to generate the assistant image by fusing the deformed image corresponding to the clothes outputted by the second clothes deformation sub-model and image regions in the person image other than a region where the original clothes are worn.

In other embodiments, the second dress-up generation sub-model 22 may be called to clear, according to the body analysis result, a region in the person image including the original clothes worn by the specified person, to obtain the image regions in the person image other than the region where the original clothes are worn.

The first clothes deformation sub-model included in the virtual dress-up student model and the second clothes deformation sub-model included in the virtual dress-up assistant model may have a same network structure, such as the network structure shown in FIG. 3. The first dress-up generation sub-model included in the virtual dress-up student model and the second dress-up generation sub-model included in the virtual dress-up assistant model may have the same network structure, for example, the first dress-up generation sub-model and the second dress-up generation sub-model may include an encoder-decoder network and a residual network. The residual network is configured to normalize a connected upper layer network, thereby facilitating parameter optimization during the model training.

It may be learned from the above that, in the disclosure, the novel knowledge distillation mechanism "teacher-assistant-student" is used to train the virtual dress-up student model, which does not rely on the body analysis result. During the training, the virtual dress-up student model is monitored by the teacher image, so that the final trained virtual dress-up student model may generate a high-fidelity virtual dress-up result without relying on the body analysis result, thereby realizing high-quality virtual dress-up without relying on the body analysis result.

Figure 7:
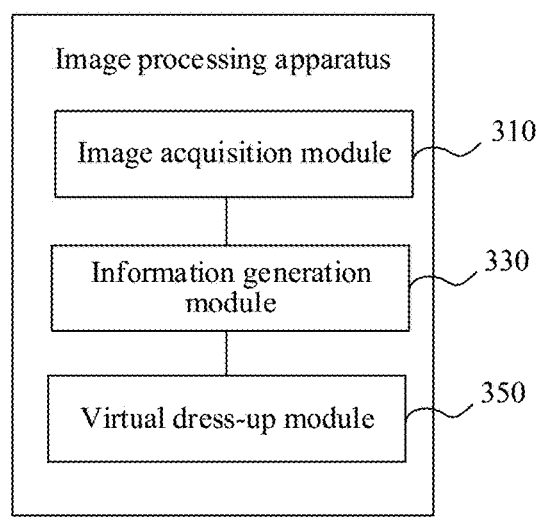
FIG. 7 is a block diagram of an image processing apparatus according to an embodiment of the disclosure.

FIG. 7 is a block diagram of an image processing apparatus according to an embodiment of the disclosure. As shown in FIG. 7, in an example embodiment, the image processing apparatus includes:

an image acquisition module 310, configured to acquire a first image including a target person and a second image including target clothes; an information generation module 330, configured to: generate, according to image features of the first image and image features of the second image, a target appearance flow feature for representing deformation of the target clothes matching a body of the target person, and generate, based on the target appearance flow feature, a deformed image of the target clothes matching the body; and a virtual dress-up module 350, configured to generate a virtual dress-up image by fusing the deformed image with the first image, in the virtual dress-up image, the target person wearing the target clothes matching the body.

In an example embodiment, the information generation module 330 includes:

a multi-layer-image-feature acquisition unit, configured to: use the first image as an input signal of a first image feature extraction model, use the second image as an input signal of a second image feature extraction model, and respectively extract a plurality of layers of image features corresponding to the input signals through the first image feature extraction model and the second image feature extraction model; and an appearance flow feature extraction unit, configured to: extract appearance flow features layer by layer from the plurality of layers of image features outputted by the first image feature extraction model and the plurality of layers of image features outputted by the second image feature extraction model, and use the appearance flow feature extracted from a last image feature layer as the target appearance flow feature.

In an example embodiment, the appearance flow feature extraction unit includes:

a first feature extraction subunit, configured to extract, from a first image feature layer of the image features outputted by the first image feature extraction model and the image features outputted by the second image feature extraction model, the appearance flow feature for representing the deformation of the target clothes matching the body of the target person; and a second feature extraction subunit, configured to optimize an appearance flow feature corresponding to each previous image feature layer following the first image feature layer of the image features outputted by the first image feature extraction model and the image features outputted by the second image feature extraction model, to obtain an appearance flow feature corresponding to a current image feature layer.

In an example embodiment, the second feature extraction subunit includes:

a first deformation subunit configured to: perform up-sampling according to the appearance flow feature corresponding to the previous image feature layer to obtain the up-sampling feature, and perform first deformation on the image feature of the second image corresponding to the current image feature layer according to the up-sampling feature, to obtain a first deformed feature; a first correction subunit configured to: correct the first deformed feature based on the image feature of the first image corresponding to the current image feature layer, and perform a first convolutional calculation on the corrected feature obtained by the correction, to obtain a first convolution feature; a second deformation subunit configured to: perform second deformation on the image feature of the second image corresponding to the current image feature layer according to a feature obtained by splicing the first convolution feature and the up-sampling feature, to obtain a second deformed feature; and an appearance flow feature acquisition subunit, configured to: perform a second convolutional calculation on the second deformed feature, and splice the calculated second convolution feature with the first convolution feature, to obtain the appearance flow feature corresponding to the current image feature layer.

In an example embodiment, the information generation module 330 further includes:

a second-order smoothing constraint unit, configured to: during the extraction of the appearance flow features layer by layer from the plurality of layers of image features outputted by the first image feature extraction model and the plurality of layers of image features outputted by the second image feature extraction model, extract the appearance flow feature according to a second-order smoothing constraint, the second-order smoothing constraint being a preset constraint for a linear correspondence between adjacent appearance flows.

In an example embodiment, the information generation module 330 is configured as the first clothes deformation sub-model included in the virtual dress-up student model, and the virtual dress-up module 350 is configured as the first dress-up generation sub-model included in the virtual dress-up student model.

In an example embodiment, the image processing apparatus further includes:

an assistant image acquisition module, configured to call a virtual dress-up assistant model, and input a body analysis result corresponding to a person image including a specified person and a first clothes image including clothes to be worn to the virtual dress-up assistant model, to obtain an assistant image outputted by the virtual dress-up assistant model; in the assistant image, the specified person wearing the clothes in the first clothes image matching a body of the specified person; a student image acquisition module, configured to input a second clothes image including original clothes and the assistant image to the to-be-trained virtual dress-up student model, to obtain a student image outputted by the to-be-trained virtual dress-up student model; in the student image, the specified person wearing the original clothes matching the body of the specified person in the assistant image, the original clothes being clothes worn by the specified person in the person image; and a parameter updating module, configured to use the person image as a teacher image, and update parameters of the to-be-trained virtual dress-up student model according image loss information between the student image and the teacher image.

In an example embodiment, the image processing apparatus further includes:

an image quality difference acquisition module, configured to: acquire an image quality difference between the assistant image and the student image, and perform operation of using the person image as the teacher image and updating the parameters of the to-be-trained virtual dress-up student model according to the image loss information between the student image and the teacher image in a case that the image quality difference is a positive value.

In an example embodiment, the assistant image acquisition module includes:

a second clothes deformation sub-model calling unit, configured to: call a second clothes deformation sub-model in the virtual dress-up assistant model, and generate, according to the body analysis result and an image feature of the first clothes image, a deformed image of the clothes to be worn matching the body of the specified person; and a second dress-up generation sub-model calling unit, configured to: call a second dress-up generation sub-model in the virtual dress-up assistant model, and generate the assistant image by fusing the deformed image corresponding to the clothes to be worn outputted by the second clothes deformation sub-model and image regions in the person image other than a region where the original clothes are worn.

In an example embodiment, the assistant image acquisition module further includes:

an image region information acquisition unit, configured to: call the second dress-up generation sub-model in the virtual dress-up assistant model, and clear, according to the body analysis result, a region in the person image including the original clothes worn by the specified person, to obtain the image regions in the person image other than the region where the original clothes are worn.

In an example embodiment, the parameter updating module includes:

an image loss value acquisition unit, configured to acquire image loss values of the student image relative to the teacher image, the image loss values including at least one of a pixel distance loss function value, a perception loss function value, or an adversarial loss function value; a loss value summation unit, configured to perform a sum operation on the image loss values to obtain an image loss sum value of the student image relative to the teacher image; and a model parameter updating unit, configured to: use the image loss sum value as the image loss information between the student image and the teacher image, and update the parameters of the to-be-trained virtual dress-up student model.

In an example embodiment, the first dress-up generation sub-model may include a coder-decoder network and a residual network, the residual network being configured to normalize a connected upper layer network.

The apparatus provided in the foregoing embodiments and the method provided in the foregoing embodiments belong to the same idea. Specific operation manners of the modules and the units have been described in detail in the method embodiments. Details are not described herein again.

An embodiment of the disclosure further provides an electronic device, including a processor and a memory, the memory storing computer-readable instructions, and the computer-readable instructions, when executed by the processor, implementing the image processing method described above.

Figure 8:
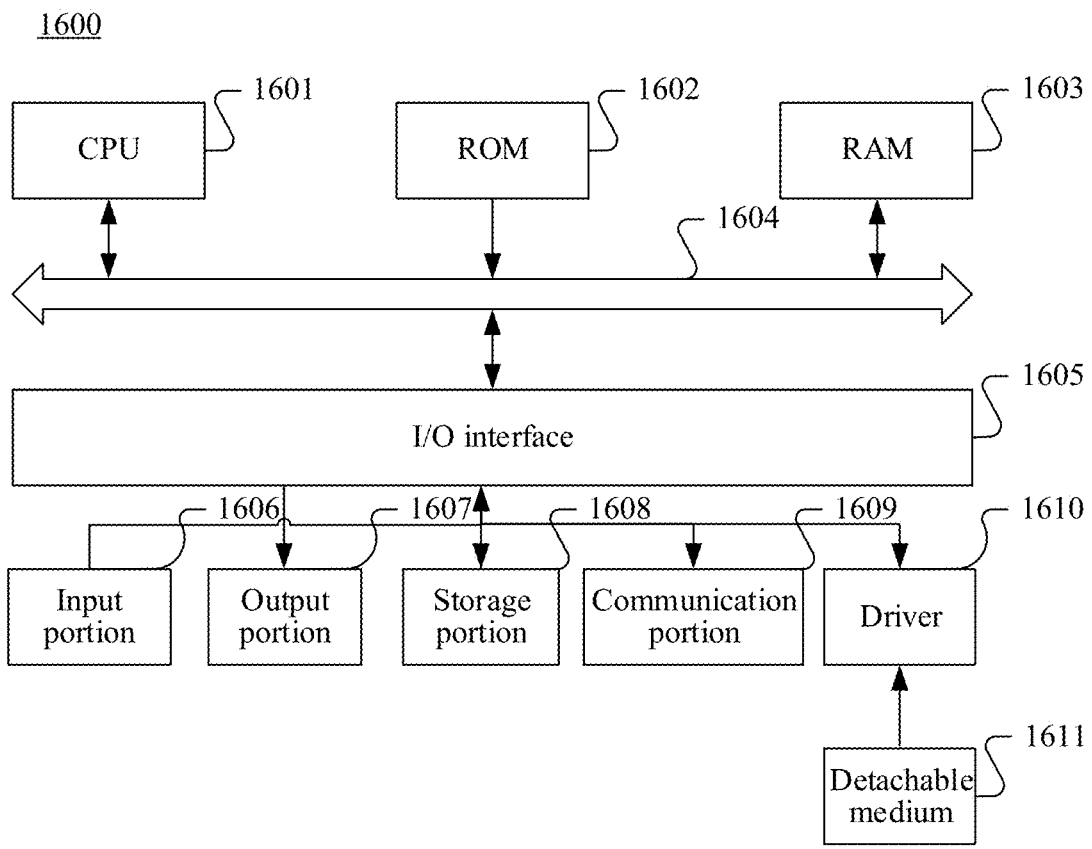
FIG. 8 is a schematic structural diagram of a computer system adapted to implement an electronic device according to an embodiment of the disclosure.

FIG. 8 is a schematic structural diagram of a computer system adapted to implement an electronic device according to an embodiment of the disclosure.

The computer system 1600 of the electronic device shown in FIG. 8 is merely an example, and does not constitute any limitation on functions and use ranges of the embodiments of the disclosure.

As shown in FIG. 8, the computer system 1600 includes a central processing unit (CPU) 1601, which may perform various suitable actions and processing based on a program stored in a read-only memory (ROM) 1602 or a program loaded from a storage part 1608 into a random access memory (RAM) 1603, for example, perform the method described in the foregoing embodiments. The RAM 1603 further stores various programs and data required for operating the system. The CPU 1601, the ROM 1602, and the RAM 1603 are connected to each other through a bus 1604. An input/output (I/O) interface 1605 is also connected to the bus 1604.

The following components are connected to the I/O interface 1605: an input part 1606 including a keyboard, a mouse, or the like, an output part 1607 including a cathode ray tube (CRT), a liquid crystal display (LCD), a speaker, or the like, a storage part 1608 including a hard disk, or the like, and a communication part 1609 including a network interface card such as a local area network (LAN) card or a modem. The communication part 1609 performs communication processing by using a network such as the Internet. A driver 1610 is also connected to the I/O interface 1605 as required. A removable medium 1611, such as a magnetic disk, an optical disc, a magneto-optical disk, or a semiconductor memory, is installed on the driver 1610 as required, so that a computer program read therefrom is installed into the storage part 1608 as required.

Particularly, according to an embodiment of the disclosure, the processes described in the following by referring to the flowcharts may be implemented as computer software programs. For example, an embodiment of the disclosure includes a computer program product. The computer program product includes a computer program stored in a computer-readable medium. The computer program includes a computer program used for performing a method shown in the flowchart. In such an embodiment, the computer program may be downloaded and installed from the network through the communication portion 1609, and/or installed from the removable medium 1611. When the computer program is executed by the CPU 1601, the various functions defined in the system of the disclosure are executed.

The computer-readable medium shown in the embodiments of the disclosure may be a computer-readable signal medium or a computer-readable storage medium or any combination of the two. The computer-readable storage medium may be, for example, an electric, magnetic, optical, electromagnetic, infrared, or semi-conductive system, apparatus, or component, or any combination of the above. More specific examples of the computer readable storage medium may include, but are not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the disclosure, the computer-readable storage medium may be any tangible medium containing or storing a program, and the program may be used by or used in combination with an instruction execution system, an apparatus, or a device. In the disclosure, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in combination with an instruction execution system, apparatus, or device. The computer program included in the readable storage medium may be transmitted using any suitable medium, including but not limited to: a wireless medium, a wired medium, or any suitable combination thereof.

The flowcharts and block diagrams in the accompanying drawings illustrate possible system architectures, functions and operations that may be implemented by a system, a method, and a computer program product according to various embodiments of the disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

Related units described in the embodiments of the disclosure may be implemented in a software manner, or may be implemented in a hardware manner, and the unit described may also be set in a processor. Names of these units do not constitute a limitation on the units in a case.

An aspect of the embodiments of the disclosure further provides a computer-readable storage medium, storing a computer program, the computer program, when executed by a processor, implementing the image processing method described above. The computer-readable storage medium may be included in the electronic device described in the foregoing embodiments, or may exist alone and is not disposed in the electronic device.

According to an aspect of the disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the image processing method according to the foregoing embodiments.

The foregoing descriptions are merely example embodiments of the disclosure, and are not intended to limit the embodiments of the disclosure. A person of ordinary skill in the art may make corresponding modifications and variations with ease without departing from the spirit and scope of the embodiments of the disclosure. Therefore, the protection scope of the disclosure shall be subject to the protection scope of the claims.

What is claimed is:

1. An image processing method comprising:
acquiring, by a computing device, a first image comprising an image of a target person and a second image comprising an image of target clothes;
inputting, to a virtual dress-up assistant model, a body analysis result corresponding to a teacher image comprising a specified person and an image of to-be-worn clothes, to obtain an assistant image, wherein, in the assistant image, the specified person wears the to-be-worn clothes matching a body of the specified person;
inputting original clothes and the assistant image to a virtual dress-up student model, to obtain a student image, wherein, in the student image, the specified person wears the original clothes matching the body of the specified person in the assistant image, and the original clothes are clothes worn by the specified person in the teacher image;
updating parameters of the virtual dress-up student model based on image loss information between the student image and the teacher image;
generating, based on the virtual dress-up student model, image features of the first image, and image features of the second image, a target appearance flow feature for representing deformation of the target clothes matching a body of the target person, and generating, based on the target appearance flow feature, a deformed image of the target clothes matching the body; and
generating a virtual dress-up image, in which the target person wears the target clothes matching the body, by fusing the deformed image with the first image.

2. The method according to claim 1, wherein the generating the target appearance flow feature comprises:
based on the first image as an input signal of a first image feature extraction model and the second image as an input signal of a second image feature extraction model, respectively extracting a plurality of layers of image features corresponding to the input signals through the first image feature extraction model and the second image feature extraction model; and
extracting appearance flow features, layer by layer, from the plurality of layers of image features outputted by the first image feature extraction model and from the plurality of layers of image features outputted by the second image feature extraction model, and generating the target appearance flow feature based on an appearance flow feature extracted from a last image feature layer.

3. The method according to claim 2, wherein the extracting the appearance flow features, layer by layer, comprises:
extracting, from a first image feature layer of the image features outputted by the first image feature extraction model and the image features outputted by the second image feature extraction model, an appearance flow feature for representing the deformation of the target clothes matching the body of the target person; and
optimizing an appearance flow feature corresponding to each previous image feature layer following the first image feature layer of the image features outputted by the first image feature extraction model and the image features outputted by the second image feature extraction model, to obtain an appearance flow feature corresponding to a current image feature layer.

4. The method according to claim 3, wherein the optimizing the appearance flow feature comprises:
performing up-sampling on the appearance flow feature corresponding to a previous image feature layer, to obtain an up-sampling feature;
performing first deformation on an image feature of the second image corresponding to the current image feature layer based on the up-sampling feature, to obtain a first deformed feature;
correcting the first deformed feature based on an image feature of the first image corresponding to the current image feature layer, and performing a first convolutional calculation on the corrected first deformed feature, to obtain a first convolution feature;
performing second deformation on the image feature of the second image corresponding to the current image feature layer based on a feature obtained by splicing the first convolution feature and the up-sampling feature, to obtain a second deformed feature; and
performing a second convolutional calculation on the second deformed feature, and splicing the calculated second convolution feature with the first convolution feature, to obtain the appearance flow feature corresponding to the current image feature layer.

5. The method according to claim 2, wherein the extracting the appearance flow features comprises extracting an appearance flow feature based on a second-order smoothing constraint, the second-order smoothing constraint being a preset constraint for a linear correspondence between adjacent appearance flows.

6. The method according to claim 1, wherein:
the generating the target appearance flow feature and the generating the deformed image of the target clothes are performed by a first clothes deformation sub-model in the virtual dress-up student model; and
the generating the virtual dress-up image is performed by a first dress-up generation sub-model in the virtual dress-up student model.

7. The method according to claim 6, wherein the first dress-up generation sub-model includes a coder-decoder network and a residual network, the residual network being configured to normalize a connected upper layer network.

8. The method according to claim 1, wherein the updating the parameters comprises:
acquiring an image quality difference between the assistant image and the student image; and
based on the image quality difference being a positive value, performing the updating the parameters based on the image loss information between the student image and the teacher image.

9. The method according to claim 1, wherein the inputting the body analysis result comprises:
calling a second clothes deformation sub-model in the virtual dress-up assistant model, and generating, based on the body analysis result and an image feature of the image of to-be-worn clothes, a deformed image of the to-be-worn clothes matching the body of the specified person; and
calling a second dress-up generation sub-model in the virtual dress-up assistant model, and generating the assistant image by fusing the deformed image outputted by the second clothes deformation sub-model and image regions in the teacher image other than a region where the original clothes are worn.

10. The method according to claim 9, further comprising:
calling the second dress-up generation sub-model in the virtual dress-up assistant model, and clearing, based on the body analysis result, a region in the teacher image comprising the original clothes worn by the specified person, to obtain the image regions in the teacher image other than the region where the original clothes are worn.

11. The method according to claim 1, wherein the updating the parameters comprises:
acquiring image loss values of the student image relative to the teacher image, the image loss values comprising at least one of a pixel distance loss function value, a perception loss function value, or an adversarial loss function value;
performing a sum operation on the image loss values to obtain an image loss sum value of the student image relative to the teacher image; and
using the image loss sum value as the image loss information between the student image and the teacher image, and updating the parameters of the virtual dress-up student model based on the image loss information between the student image and the teacher image.

12. An electronic device, comprising:
a memory, storing computer-readable instructions; and
a processor, reading the computer-readable instructions stored in the memory to perform the method according to claim 1.

13. An image processing apparatus comprising:
at least one processor; and
memory storing instructions that, when executed by the at least one processor, cause the image processing apparatus to:
acquire a first image comprising an image of a target person and a second image comprising an image of target clothes;
input, to a virtual dress-up assistant model, a body analysis result corresponding to a teacher image comprising a specified person and an image of to-be-worn clothes, to obtain an assistant image, wherein, in the assistant image, the specified person wears the to-be-worn clothes matching a body of the specified person;
input original clothes and the assistant image to a virtual dress-up student model, to obtain a student image, wherein, in the student image, the specified person wears the original clothes matching the body of the specified person in the assistant image, and the original clothes are clothes worn by the specified person in the teacher image;
update parameters of the virtual dress-up student model based on image loss information between the student image and the teacher image;
generate, based on the virtual dress-up student model, image features of the first image, and image features of the second image, a target appearance flow feature for representing deformation of the target clothes matching a body of the target person, and generate, based on the target appearance flow feature, a deformed image of the target clothes matching the body; and
generate a virtual dress-up image of the target person wearing the target clothes by fusing the deformed image with the first image.

14. The image processing apparatus according to claim 13, wherein the instructions, when executed by the at least one processor, cause the image processing apparatus to:
- based on the first image as an input signal of a first image feature extraction model and the second image as an input signal of a second image feature extraction model, respectively extract a plurality of layers of image features corresponding to the input signals through the first image feature extraction model and the second image feature extraction model; and
- extract appearance flow features, layer by layer, from the plurality of layers of image features outputted by the first image feature extraction model and from the plurality of layers of image features outputted by the second image feature extraction model, and generate the target appearance flow feature based on an appearance flow feature extracted from a last image feature layer.

15. The image processing apparatus according to claim 14, wherein the instructions, when executed by the at least one processor, cause the image processing apparatus to:
- extract, from a first image feature layer of the image features outputted by the first image feature extraction model and the image features outputted by the second image feature extraction model, an appearance flow feature for representing the deformation of the target clothes matching the body of the target person; and
- optimize an appearance flow feature corresponding to each previous image feature layer following the first image feature layer of the image features outputted by the first image feature extraction model and the image features outputted by the second image feature extraction model, to obtain an appearance flow feature corresponding to a current image feature layer.

16. The image processing apparatus according to claim 15, wherein the instructions, when executed by the at least one processor, cause the image processing apparatus to:
- perform up-sampling on the appearance flow feature corresponding to the previous image feature layer, to obtain an up-sampling feature;
- perform first deformation on an image feature of the second image corresponding to the current image feature layer based on the up-sampling feature, to obtain a first deformed feature;
- correct the first deformed feature based on an image feature of the first image corresponding to the current image feature layer, and perform a first convolutional calculation on the corrected first deformed feature, to obtain a first convolution feature;
- perform second deformation on the image feature of the second image corresponding to the current image feature layer based on a feature obtained by splicing the first convolution feature and the up-sampling feature, to obtain a second deformed feature; and
- perform a second convolutional calculation on the second deformed feature, and splice the calculated second convolution feature with the first convolution feature, to obtain the appearance flow feature corresponding to the current image feature layer.

17. The image processing apparatus according to claim 14, wherein the instructions, when executed by the at least one processor, cause the image processing apparatus to extract an appearance flow feature, of the appearance flow features, based on a second-order smoothing constraint, the second-order smoothing constraint being a preset constraint for a linear correspondence between adjacent appearance flows.

18. The image processing apparatus according to claim 14, wherein the instructions, when executed by the at least one processor, cause the image processing apparatus to:
- generate the target appearance flow feature and generate the deformed image of the target clothes by using a first clothes deformation sub-model in the virtual dress-up student model; and
- generate the virtual dress-up image by using a first dress-up generation sub-model in the virtual dress-up student model.

19. A non-transitory computer-readable storage medium, storing instructions that, when executed, cause:
- acquiring a first image comprising an image of a target person and a second image comprising an image of target clothes;
- inputting, to a virtual dress-up assistant model, a body analysis result corresponding to a teacher image comprising a specified person and an image of to-be-worn clothes, to obtain an assistant image, wherein, in the assistant image, the specified person wears the to-be-worn clothes matching a body of the specified person;
- inputting original clothes and the assistant image to a virtual dress-up student model, to obtain a student image, wherein, in the student image, the specified person wears the original clothes matching the body of the specified person in the assistant image, and the original clothes are clothes worn by the specified person in the teacher image;
- updating parameters of the virtual dress-up student model based on image loss information between the student image and the teacher image;
- generating, based on the virtual dress-up student model, image features of the first image, and image features of the second image, a target appearance flow feature for representing deformation of the target clothes matching a body of the target person, and generating, based on the target appearance flow feature, a deformed image of the target clothes matching the body; and
- generating a virtual dress-up image of the target person wearing the target clothes by fusing the deformed image with the first image.

20. The non-transitory computer-readable storage medium of claim 19, wherein the instructions, when executed, cause the updating the parameters by causing:
- acquiring an image quality difference between the assistant image and the student image; and
- based on the image quality difference being a positive value, performing the updating the parameters based on the image loss information between the student image and the teacher image.

* * * * *